United States Patent [19]
Janson

[11] 3,822,390
[45] July 2, 1974

[54] ADJUSTABLE-TORQUE MAGNETIC BRAKE

[75] Inventor: Gunnar H. Janson, Aurora, Ohio

[73] Assignee: Lear Siegler, Inc., Santa Monica, Calif.

[22] Filed: Sept. 10, 1973

[21] Appl. No.: 395,750

[52] U.S. Cl. ................ 310/104, 310/190, 310/268
[51] Int. Cl. ........................................ H02k 49/10
[58] Field of Search ............ 310/93, 103, 104, 105, 310/106, 268, 190, 191, 209

[56] References Cited
UNITED STATES PATENTS

| | | | |
|---|---|---|---|
| 2,361,239 | 10/1944 | Ransom | 310/93 X |
| 2,366,562 | 1/1945 | Schug | 310/93 UX |
| 2,601,961 | 7/1952 | Stephenson | 310/93 UX |
| 2,605,875 | 8/1952 | Stephenson | 310/93 X |
| 2,741,714 | 4/1956 | Regelman | 310/93 |
| 2,806,158 | 9/1957 | Emery et al. | 310/103 |
| 3,068,372 | 12/1962 | Bell | 310/190 X |
| 3,141,102 | 7/1964 | Steingroever | 310/268 |

Primary Examiner—D. F. Duggan
Attorney, Agent, or Firm—Bosworth, Sessions & McCoy

[57] ABSTRACT

An adjustable-torque magnetic device for dynamically braking a reel, spool or other rotary element. The device utilizes a multipole permanent magnet with poles in the form of circular sectors, and a pair of spaced magnetic circuit discs located one-on-each-side-of and coaxial with the permanent magnet, one of the discs being operatively connected to the rotary element. The circuit discs provide flux paths between pole sectors of opposite polarity and thus cause a magnetic drag resisting relative rotation. A flux gate is interposed between the permanent magnet and one of the circuit discs so that the braking torque may be adjusted by positioning the gate relative to the magnet between a maximum torque position wherein magnetic flux passes through the flux gate to and from the adjacent circuit disc, to a minimum torque position wherein a portion of the flux is shunted through the gate to bypass the adjacent circuit disc.

12 Claims, 6 Drawing Figures

PATENTED JUL 2 1974 3,822,390

SHEET 2 OF 2

ADJUSTABLE-TORQUE MAGNETIC BRAKE

BACKGROUND OF THE INVENTION

This invention relates to dynamic braking devices such as for use in tensioning strands, tapes, wires etc., and especially to such devices utilizing magnetic friction or drag to provide the braking torque. More particularly, the invention relates to magnetic devices for applying a selective braking torque by preadjusting the device to a predetermined flux density in order to obtain a desired tension in the strand, tape, wire etc.

Braking devices of this type are most commonly used in strand tensioning applications where a supply reel, for example, must have a predetermined drag acting thereon in order to maintain a certain tension in the strand. Typical applications are in the processing of textile cords, wire winding, film winding, processing of plastic film and tire cord hot stretching. The device is usually anchored to a fixed support and has a journaled shaft or axle connected to the reel, spool, roll or the like to be rotated. In these applications it is often quite important that the tension in the material be very accurately controlled. Accordingly, the braking device must be capable of fine adjustment as to the braking torque applied or in other words the amount of magnetic flux present between the friction or drag generating surfaces—usually opposed surfaces of a permanent magnet or electromagnet and an output plate that forms part of the magnetic flux circuit.

The most common type of device for these applications utilizes an electromagnet with external circuit connections to provide the necessary magnetic field strength. The adjustment of the braking torque is accomplished by varying the current supplied to the electromagnet. These types of devices are cumbersome in view of the external circuit connections required and are vulnerable to damage in many manufacturing environments.

In permanent-magnet-type devices, certain methods have been used for adjusting the braking torque and these include increasing the air gap between the magnet and the circuit element being rotated to decrease the flux density, and the insertion of magnetic shunts to short circuit the flux. These methods, however, require a substantial physical effort to effect the necessary adjustment since they involve a considerable change in the magnetic states of the parts involved.

A principal disadvantage of the prior art devices described above is the limited range of torque adjustment obtainable. The ratio of maximum to minimum torque magnitude is typically about 4:1. This small adjustment range limits the utility of a particular braking device.

The magnetic braking device of the present invention, however, reduces the deficiencies indicated above and affords other features and advantages heretofore not obtainable.

SUMMARY OF THE INVENTION

It is among the objects of the invention to enable a dynamic braking device utilizing magnetic friction or drag to produce the braking torque, to be readily adjusted throughout a wide range of torque levels.

Another object is to provide a magnetic braking device that is free of external electrical connections and which requires a minimum of maintenance.

These and other objects and advantages are accomplished by the novel construction of the magnetic braking device of the invention wherein means is provided for adjusting the braking torque over a wide range of torque settings. The device utilizes a multipole permanent magnet of generally cylindrical form with poles in the form of circular sectors. On opposite sides of the magnet and coaxial therewith are two magnetic circuit elements, the element on one side being operatively connected to a reel, spool, or other rotary element to be braked. The circuit elements, normally in the form of ferromagnetic discs or plates, provide flux paths between pole sectors of opposite polarity. The flux circuits provide the magnetic "friction" or "drag" to resist relative rotation between the magnet and the output circuit disc.

A flux gate is interposed between the magnet and one of the circuit discs to provide a means for varying the flux density in the working area. The flux gate is adapted for adjustment relative to the permanent magnet between a maximum torque position wherein magnetic flux passes completely through the flux gate to the adjacent circuit element, and a minimum torque position wherein a portion of the magnetic flux is shunted through the flux gate to bypass the respective adjacent circuit element.

In the preferred form, the flux gate comprises an annular disc with gates in the form of circular sectors corresponding in number and shape to the poles of the magnet. The sectors are separated by radial slots. When the sectors of the flux gate are aligned with the pole sectors of the magnet, the flux passes through the gate to or from the respective circuit disc. When the flux gate is rotated relative to the magnet to a position where its sectors are centered at the boundry between adjacent pole sectors of the magnet, a portion of the flux is shunted through the respective gate to bypass the adjacent circuit disc and thus reduce the flux in the working area. The range of angular adjustment of this specific form of flux gate relative to the magnet is usually one half the sector angle of the pole. The range of adjustment thus extends from the maximum torque limit position wherein the flux gate sectors shunt little or no flux therethrough, to the minimum torque limit position wherein a substantial portion of the magnetic flux is shunted therethrough.

While a four pole permanent magnet is preferred magnets with more poles may be desired in some applications where larger devices and higher torque capabilities are required.

DESCRIPTION OF THE PREFERRED EMBODIMENT

Figure 1:
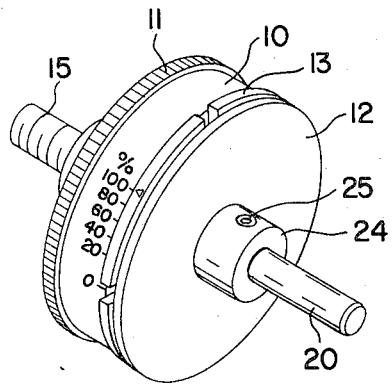
FIG. 1 is a perspective view of a magnetic braking device embodying the invention.
Figure 2:
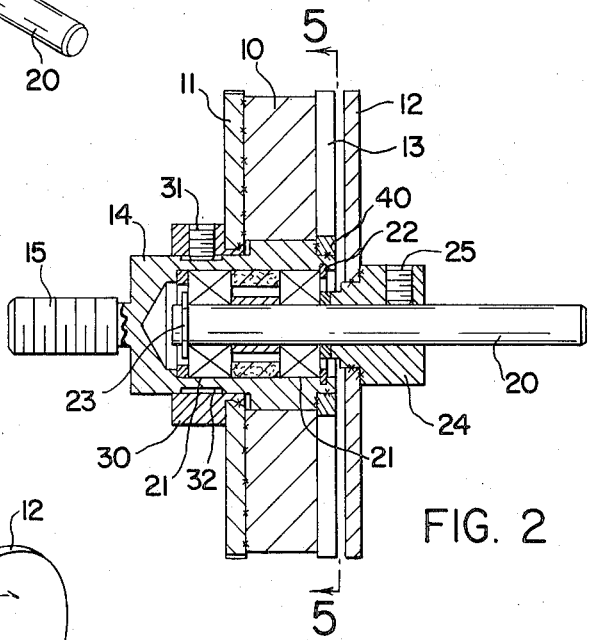
FIG. 2 is a sectional view taken along the axis of the device of FIG. 1.

Referring more particularly to the drawings there is shown an adjustable-torque magnetic braking device embodying the invention and adapted for use in braking a rotary supply reel, spool, roll or the like. The device comprises a permanent four pole ceramic magnet 10 formed of sintered magnetisable particles, and of a type commercially available. The magnet 10 is of annular shape and has its poles in the form of 90° sectors. Located on opposite sides of the magnet 10 and coaxial therewith are two circuit discs including a backup disc 11 and a drive disc 12 which provide circuit paths for magnetic flux. Backup disc 11 is formed of suitable magnetic material such as magnetically "soft" steel. Drive disc 12 is formed of a high hysteresis loss material such as that sold under the trade designation "VICALLOY."

Located between the magnet 10 and the drive disc 12 and coaxial therewith is a flux gate disc 13 the construction and function of which will be described in detail below. The magnet 10, backup disc 11 and flux gate disc 13 are supported on a cylindrical body 14 with a threaded stud 15 on one end that may be connected to a suitable supporting structure. The body 14 is of generally tubular form and defines an interior cylindrial chamber.

Figure 5:
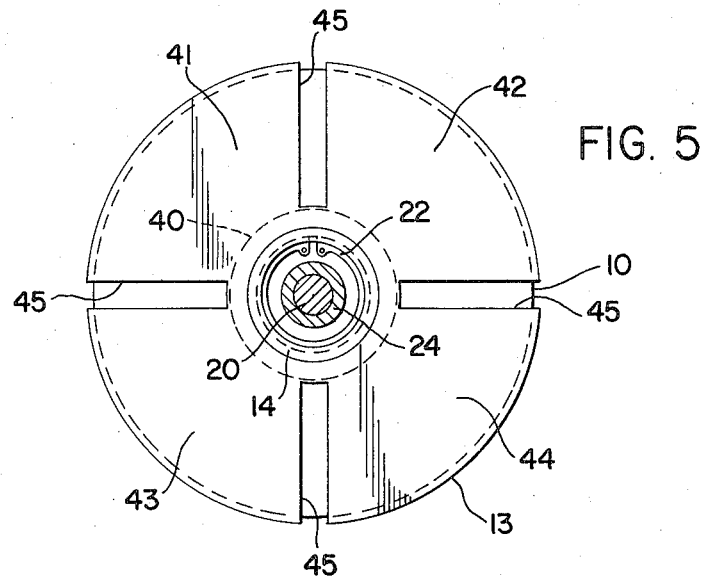
FIG. 5 is a sectional view taken on the line 5—5 of FIG. 2.

An output shaft 20 which supports or is otherwise operatively connected to a reel, spool or other rotary member (not shown) is journaled in the body 14 by means of roller bearing units 21. The units 21 are retained within the body by a C-ring 22 (FIG. 5) that seats in an annular groove in the body 14. The output shaft 20 is retained within the bearing units 21 by a retaining ring 23 which seats in an annular groove in the shaft 20. The output disc 12 is bonded with an epoxy resin, for example, to a hub 24 that is secured to the output shaft 20 by a set screw 25. Accordingly, the output disc 12 revolves with the rotary member and because it is part of the magnetic flux circuit, it resists rotation relative to the permanent magnet 10 as the result of magnetic friction or drag.

The magnet 10 is bonded to the backup disc 11 such as with an epoxy resin and the disc 11 is, in turn, secured to a hub 30 mounted on a shoulder portion of the body 14. The hub 30 is secured to the body 14 by a set screw 31 which seats in an annular groove 32 around the shoulder portion of the body 14. Accordingly, the hub 30 may be angularly adjusted relative to the body 14.

The flux gate disc 13 has the form of an annular steel plate (e.g., A.I.S.I. 1010–1020) with a stainless steel liner ring 40 silver brazed to its inner edge. The liner ring 40 is formed, for example, of stainless steel stock (e.g., A.I.S.I. 304 tubing). The disc 13 is divided into four 90° gate sectors 41, 42, 43 and and 44 by radial slots 45 extending from the outer edge to the liner ring 40. The liner ring 40 is bonded using epoxy resin, for example, to a shoulder formed in the body 14 and thus is in fixed relation relative to the supporting structure on which the device is mounted.

The flux gate disc 13, being interposed between the permanent magnet 10 and the output circuit disc 12, forms a part of the flux circuits between opposite pole sectors. The function or valving effect of the gate sectors is dependent upon their angular position relative to the pole sectors of the magnet 10.

Figure 3:
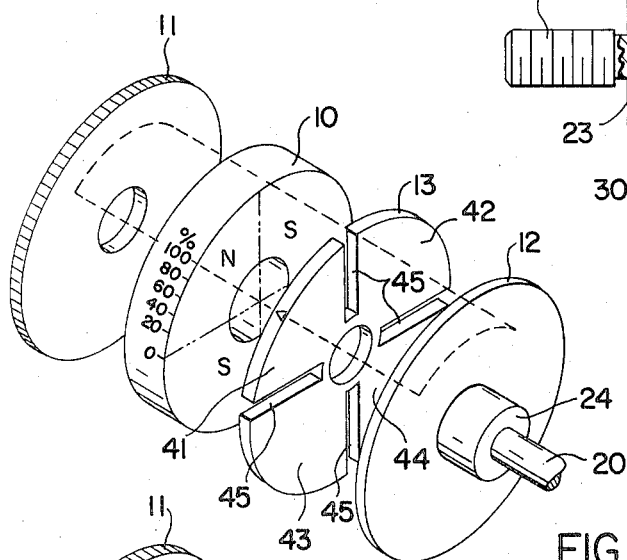
FIG. 3 is an exploded perspective view of the principal operating parts of the device of FIGS. 1 and 2, illustrating the maximum torque position of adjustment.
Figure 4:
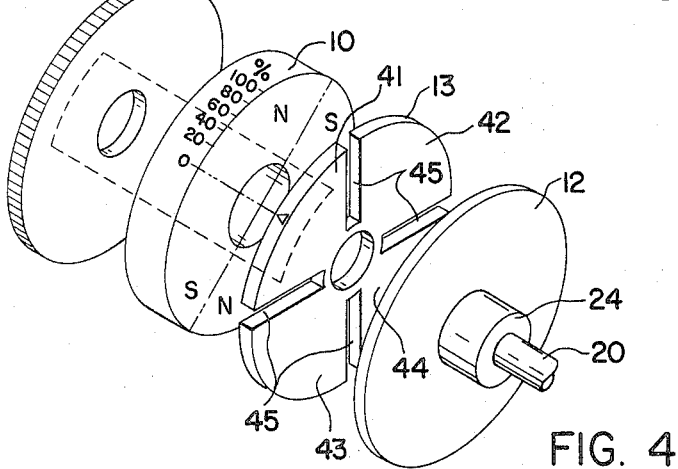
FIG. 4 is an exploded perspective view similar to FIG. 3 and illustrating the principal operating parts of the device in the minimum torque position of adjustment.

As indicated above, the magnet 10 and backup circuit plate 11 are secured to the hub 30 which is mounted for rotary adjustment relative to the body 14 and thus relative to the flux gate disc 13. The function of the flux gate disc 13 is best illustrated in FIGS. 3 and 4. In FIG. 3 the permanent magnet 10 has been adjusted to a position wherein the pole sectors thereof are angularly aligned with the gate sectors 41, 42, 43 and 44 of the flux gate disc 13. In this condition the magnetic flux paths between pole sectors of opposite polarity extend through the respective gates to and from the output circuit disc 12 as indicated by the dashed lines in FIG. 3. Accordingly, there is no valving function and a maximum magnetic friction or drag is exerted on the output circuit disc 12.

FIG. 4 illustrates the minimum torque condition of the device wherein the magnet 10 has been turned through a 45° angle relative to the flux gate disc 13 by loosening the set screw 31, turning the backup circuit disc 11 and magnet 10 to the position illustrated in FIG. 4, and then retightening the set screw 31. In this position each of the gate sectors 41, 42, 43 and 44 is centered at the boundary between pole sectors of opposite polarity. As indicated by dashed lines in FIG. 4, a portion of the magnetic flux is shunted through the respective gate so as to bypass the output circuit disc 12. This substantially reduces the magnetic flux in the space between the flux gate disc 13 and the output circuit disc 12 and thus correspondingly reduces the magnetic friction or drag all of which results in a minimum (or zero) braking torque.

It will be apparent that by manually adjusting the position of the magnet 10 and backup plate 11 to positions between the limit positions illustrated in FIGS. 3 and 4, a desired braking torque setting can be obtained. In the embodiment shown, the flux gate disc 13 is provided with an index mark and a scale is printed in percentage increments on the cylindrical outer surface of the permanent magnet 10. The adjustment of the braking torque involves very little change in the magnetic state of the working parts so that the torque required to rotate the magnet 10 from a maximum torque setting to a minimum torque setting is minimal. In the embodiment shown the highest adjustment torque required at the minimum braking torque end of the scale is about three ounce-inches.

Figure 6:
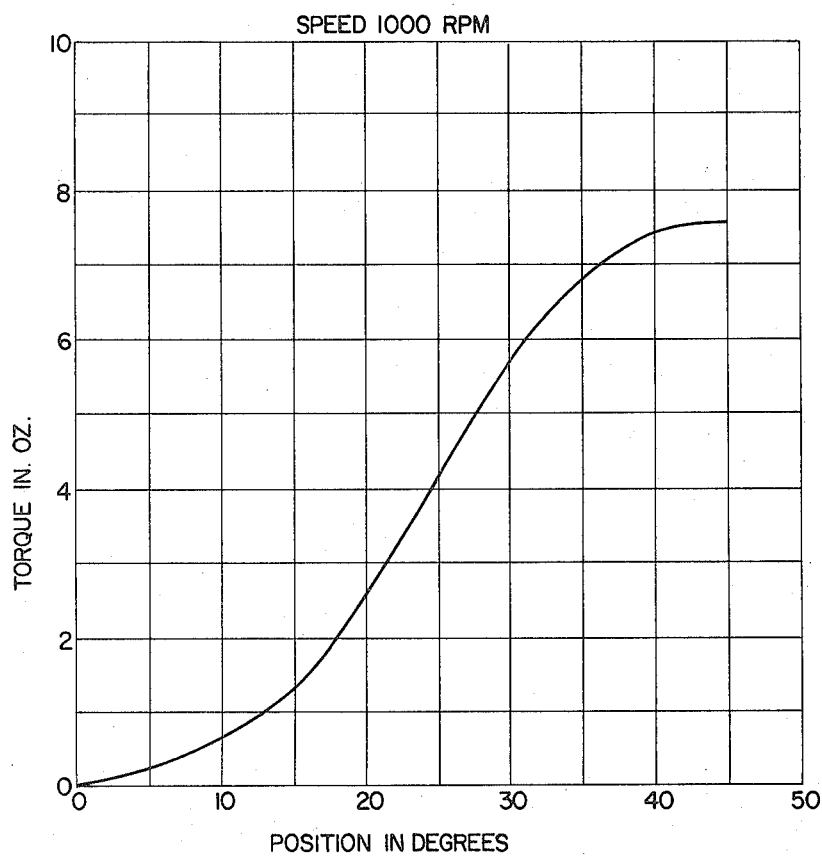
FIG. 6 shows a curve illustrating the plot of the magnitude of braking torque provided by the device throughout its range of torque adjustment.

FIG. 6 illustrates the variation in braking torque in the device shown throughout its range of angular adjustment. It will be seen that torque in ounce-inches varies from about .06 inch-ounces at the minimum torque setting to about 6.8 inch-ounces at the maximum torque setting for the flux gates. While the torque variation becomes fairly flat at the high and low ends of the scale, the variation is essentially linear in the range between about 15° and 35°. It will be noted that the ratio of maximum braking torque to minimum braking torque is about 120:1.

It will be apparent that for certain applications and for larger designs it may be advantageous to increase the number of poles. This would correspondingly increase the number of gate sectors of the flux gate disc and decrease the range of angular rotation from the high torque to low torque positions.

It will also be apparent that the invention may be used in connection with clutching applications as well as braking applications or in combinations to provide both clutching and braking functions.

Also an electromagnet may be used instead of a permanent magnet although certain advantages of the invention would be sacrificed.

In a modified form of the invention, magnetic particles are confined in the gap between the flux gate disc 13 and drive disc 12. In this form, drive disc 12 is preferably formed of magnetically "soft" steel. Additionally, conventional steps can be taken to enclose the magnetic particles in the gap. For example the slots in flux gate disc 13 can be filled with solid non-magnetic material and appropriate seals provided between relatively moving parts.

The same principle of output torque adjustment by relative rotation of the magnet and flux gate disc to regulate or gate the flux passing through the output disc is used in this modified magnetic particle form. This modified form provides higher torque ratings for a given size than the hysteresis form of the invention because of the well-known higher torque transmitting capability of magnetic particle devices versus hysteresis devices. Both forms have a comparable range of adjustment provided by their common output torque adjustment mode of operation.

While the invention has been shown and described with respect to a specific embodiment and modifications thereof this is intended for the purpose of illustration rather than limitation and other variations and modifications will be apparent to those skilled in the art all within the intended spirit and scope of the invention. Accordingly, the patent is not to be limited in scope and effect to the specific forms herein shown and described nor in any other way that is inconsistent with the extent to which the progress in the art has been advanced by the invention.

I claim:

1. An adjustable-torque magnetic device for dynamically braking a rotary member comprising:
   a multipole magnet of generally cylindrical form and having circularly arranged poles,
   a pair of magnetic circuit elements, one on each side of and coaxial with said magnet, for providing flux paths between opposite polarity poles of said magnet, one of said elements being mounted for rotation and operatively connected to said rotary member, and
   flux gate means interposed between said magnet and said one of said circuit elements and spaced from said one of said circuit elements and being adapted for rotary adjustment relative to said magnet between a maximum output torque position wherein magnetic flux paths to said circuit elements are completed through said flux gate means and a minimum torque position wherein magnetic flux in each of said flux paths is shunted through said flux gate means to bypass said one of said circuit elements.

2. A device as defined in claim 1 wherein said magnet has four poles, each in the form of a 90° circular sector and wherein said flux gate means comprises a disc of magnetizable material with four 90° gate sectors defined by four radially aligned non-magnetic segments.

3. A device as defined in claim 2 wherein said flux gate disc is adapted to be operatively connected to a fixed mounting structure and wherein said magnet is adapted for angular adjustment about its axis relative to said flux gate disc through a 45° angle between a position with said pole sectors in registration with said flux gate sectors and a position wherein said flux gate sectors are centered between two adjacent pole sectors.

4. A device as defined in claim 1 wherein said multipole magnet is a permanent magnet.

5. A device as defined in claim 1 wherein said multipole magnet is an electromagnet.

6. A device as defined in claim 1 wherein said one of said magnetic circuit elements is formed of high hysteresis loss material.

7. A device as defined in claim 1 wherein said one of said magnetic circuit elements is formed of magnetically soft material in which magnetic particles are confined in the space between said one of said magnetic circuit elements and said flux gate disc.

8. An adjustable-torque magnetic coupling for dynamically braking a rotating member comprising:
   a multipole, permanent magnet of generally cylindrical form and having poles in the form of circular sectors,
   a pair of coaxial circuit discs axially spaced on opposite sides of said magnet for providing magnetic flux paths between adjacent pole sectors, one of said discs being of high hysteresis loss material and connected to said rotary member, and
   a flux gate disc interposed between said magnet and said one of said circuit discs, and having gate portions defined by radial slots, said gate portions generally corresponding in shape to said pole sectors, said flux gate disc being adapted for rotary adjustment relative to said magnet between a maximum torque position with said flux gate sectors aligned with said pole sectors whereby magnetic flux paths are completed through said adjacent circuit disc, and a minimum torque position with said flux gate sectors generally centered at the boundary between adjacent pole sectors whereby magnetic flux is shunted from said paths through said flux gate sectors.

9. An adjustable-torque dynamic coupling for applying magnetic braking torque to a rotary member comprising:
   a multipole permanent magnet of generally cylindrical form and having opposite end faces and at least four symmetrical pole sectors,
   a circuit disc affixed to one end face of said magnet and coaxial therewith,
   a flux gate disc positioned coaxial with and adjacent the opposite end face of said magnet and having flux gate sectors magnetically independent from each other, said flux gate sectors corresponding in number to said magnetic poles, said magnet and flux gate flux being adapted for angular adjustment relative to one another about their axis between a first position wherein said flux gate sectors are in matching alignment with said pole sectors and a second position wherein said flux gate sectors are centered approximately midway between two pole sectors, and
   an output circuit disc located coaxial with, spaced from, and adjacent said flux gate disc and connected to said rotary member whereby when said flux gate disc is in said first position, magnetic flux to and from each pole sector passes through a flux gate sector to and from said output circuit disc and when said flux gate disc is in said second position magnetic flux is shunted through said flux gate sectors to bypass said output circuit disc.

10. A device as defined in claim 9 including magnetic particles confined in the space between said flux gate disc and said output circuit disc.

11. A device as defined in claim 10 in which said output circuit disc is formed of a magnetically soft material.

12. A device as defined in claim 9 in which said output circuit disc is formed of a high hysteresis loss material.

* * * * *

UNITED STATES PATENT OFFICE
CERTIFICATE OF CORRECTION

Patent No. 3,822,390                    Dated July 2, 1974

Inventor(s) Gunnar H. Janson

It is certified that error appears in the above-identified patent and that said Letters Patent are hereby corrected as shown below:

Column 6, line 59, change "flux", second occurrence, to

--disc--

Signed and sealed this 5th day of November 1974.

(SEAL)
Attest:

McCOY M. GIBSON JR.                C. MARSHALL DANN
Attesting Officer                  Commissioner of Patents